(12) United States Patent
Eatedali et al.

(10) Patent No.: US 9,686,575 B2
(45) Date of Patent: Jun. 20, 2017

(54) SYSTEMS AND METHODS FOR DIGITAL LIBRARY CHANNEL CREATION

(71) Applicant: Disney Enterprises, Inc., Burbank, CA (US)

(72) Inventors: Josiah Eatedali, Los Angeles, CA (US); Mark Arana, West Hills, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 14/322,471

(22) Filed: Jul. 2, 2014

(65) Prior Publication Data
US 2016/0007066 A1    Jan. 7, 2016

(51) Int. Cl.
| | |
|---|---|
| *H04N 21/433* | (2011.01) |
| *H04N 21/262* | (2011.01) |
| *G06F 17/30* | (2006.01) |
| *H04N 21/2668* | (2011.01) |
| *H04N 21/45* | (2011.01) |
| *H04N 21/475* | (2011.01) |
| *H04N 21/472* | (2011.01) |
| *H04N 21/63* | (2011.01) |
| *H04N 21/482* | (2011.01) |
| *H04N 21/643* | (2011.01) |
| *H04N 21/432* | (2011.01) |

(52) U.S. Cl.
CPC . *H04N 21/26258* (2013.01); *G06F 17/30864* (2013.01); *H04N 21/2668* (2013.01); *H04N 21/4532* (2013.01); *H04N 21/4755* (2013.01); *H04N 21/47217* (2013.01); *H04N 21/4825* (2013.01); *H04N 21/632* (2013.01); *H04N 21/64322* (2013.01); *H04N 21/433* (2013.01); *H04N 21/4325* (2013.01)

(58) Field of Classification Search
USPC .............................................. 725/46, 52, 55
See application file for complete search history.

(56) References Cited

U.S. PATENT DOCUMENTS

| | | | |
|---|---|---|---|
| 2009/0025029 A1* | 1/2009 | Lee | H04N 5/44543 725/37 |
| 2014/0053198 A1* | 2/2014 | Sirpal | H04N 21/8173 725/43 |
| 2014/0109142 A1* | 4/2014 | van Coppenolle et al. | 725/46 |

* cited by examiner

*Primary Examiner* — Kieu Oanh T Bui
(74) *Attorney, Agent, or Firm* — Sheppard, Mullin, Richter & Hampton LLP

(57) ABSTRACT

The present disclosure provides for systems and methods for digital library channel creation. The disclosed methods and systems utilize a user's digital media library to create and/or simulate one or more broadcast channels for viewing by the user. Channels may be created randomly or according to particular preferences set by the user. In a further aspect, the disclosed methods and systems allow users to broadcast or share their channels with other users.

20 Claims, 4 Drawing Sheets

DIGITAL LIBRARY CHANNEL
CREATION METHOD 200

SYSTEMS AND METHODS FOR DIGITAL LIBRARY CHANNEL CREATION

TECHNICAL FIELD

The present disclosure relates generally to digital media, and more particularly to systems and methods for creation of digital library channels.

SUMMARY OF THE INVENTION

The present disclosure may be embodied in a method comprising populating a digital library channel with a plurality of digital media assets from a user's digital media library arranged in a particular order and scheduled to play on a user device at scheduled times, the plurality of digital media assets and scheduled times defining a broadcast schedule; and presenting a current digital media asset according to the broadcast schedule.

In one aspect of this embodiment, the method may further comprise receiving one or more digital library channel settings on the user device, wherein the plurality of digital media assets populating the digital library channel are selected according to the one or more digital library channel settings. The one or more digital library channel settings may be pre-loaded by a service provider. Alternatively, the one or more digital library channel settings may be one or more user-specified digital library channel settings. In a further aspect, the on or more digital library channel settings may comprise at least one of the following: genre settings, franchise settings, studio settings, actor/actress settings, director settings, and/or quality rating settings.

In another aspect of this embodiment, presenting a current digital media asset according to the broadcast schedule may comprise playing the current digital media asset from a point within the current digital media asset that is not the beginning of the current digital media asset. In a further aspect, the method may further comprise presenting an option to view the current media content asset from its beginning; receiving a command to play the current media content asset from its beginning; and playing the current media content from its beginning.

The method may also further comprise transmitting digital library channel information to a second user; accessing a digital library associated with the second user; determining whether the current digital media asset is in the digital library associated with the second user. If the current digital media asset is contained in the digital library associated with the second user, the method may comprise playing the current digital media asset, or, alternatively, if the current digital media asset is not contained in the digital library associated with the second user, the method may comprise offering the second user an opportunity to acquire the current digital media asset.

The present disclosure may also be embodied in computer readable media comprising an instruction set configured to command a computing device to carry out the methods described herein.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

The disclosure provided herein describes systems and methods for digital library channel creation.

With the increasing availability and cost-effectiveness of non-volatile memory, users are able to buy and amass very large collections of digital media. Digital media may include any digital content that can be viewed, heard, or otherwise experienced by a user, including audio content, images, videos, games, or the like.

Figure 1:
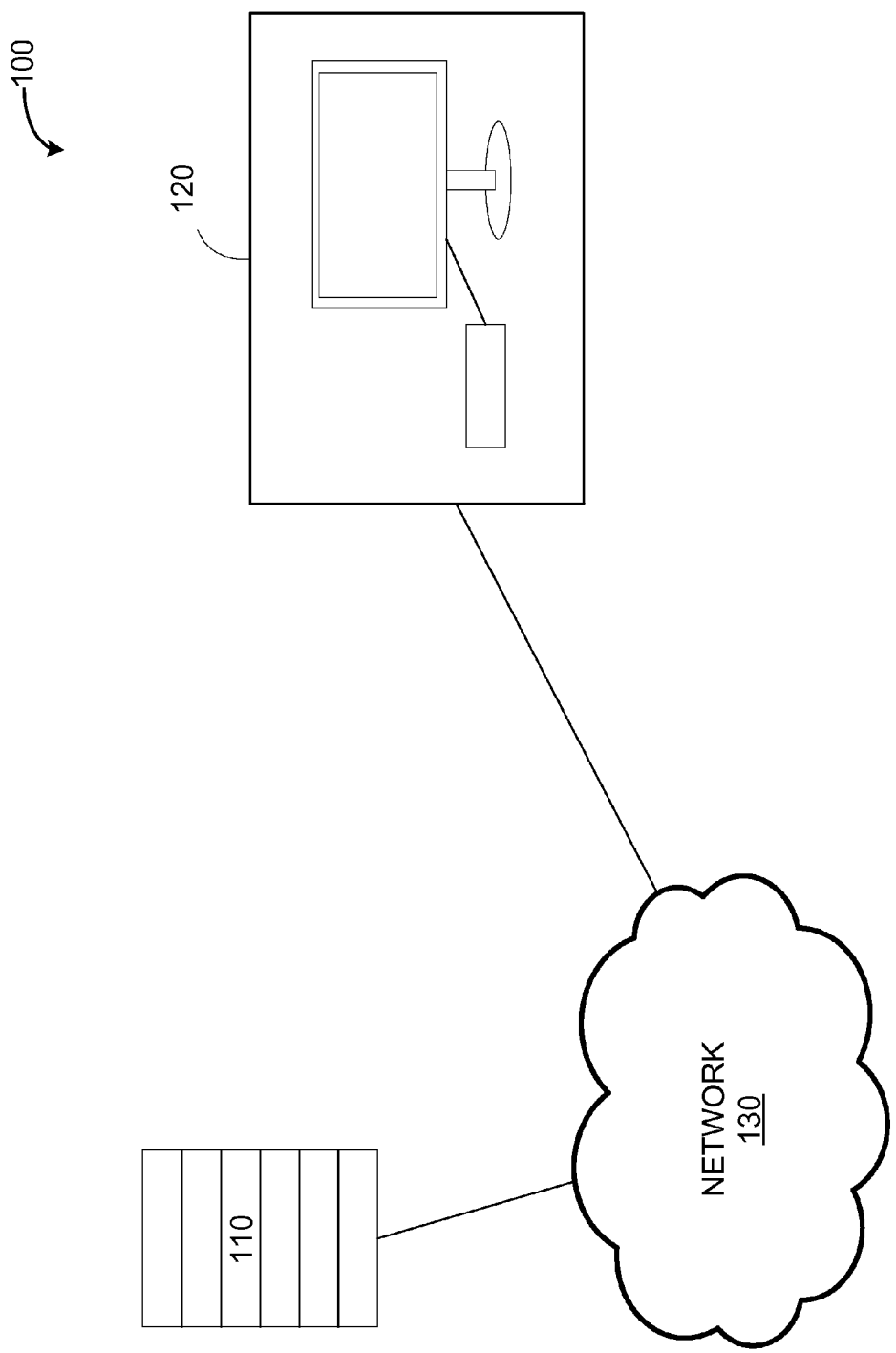
FIG. 1 provides a digital media distribution network in accordance with an aspect of an embodiment of the present disclosure.

FIG. 1 provides a representation of a digital media distribution network 100. The digital media distribution network 100 includes a remote server 110, and a user entertainment system 120, connected over a wide-area network 130, such as the Internet. The user entertainment system 120 is any device on which the user can experience digital media, examples of which may include a tablet, a smart phone, a Blu-Ray or DVD player or other home entertainment system, a personal computer, a home gaming system, or the like. The remote server 110 may be any data server that is used to provide and/or store digital media content. Content may be purchased and then downloaded locally to the user entertainment system 120, or the content may be purchased and then streamed from the remote server 110 to the user entertainment system 120. It should be understood that FIG. 1 is a simple block representation of a content distribution network, and each of the different components may comprise numerous components or modules to carry out the functions described herein. For example, there may be numerous remote servers, and different remote servers may play different roles (e.g., storing content, providing content for streaming, storing user purchase information, providing user interaction interface, etc.). Similarly, the user's local entertainment system 120 may comprise numerous components, e.g., the user entertainment system 120 may comprise numerous devices through which a user can experience digital media. In certain embodiments, the user entertainment system 120 may also comprise a local network for storing, transmitting, and receiving digital media between the various devices on a user's local network.

Large collections of digital content allow users easy access to a variety of digital content such that if a user wants to experience a particular piece of digital content, it is readily available. However, it can become the case that these collections become so large that when a user does not have a particular piece of digital media in mind, they may be discouraged from taking the time to browse the collection to find a particular piece of digital media to watch. For example, a user may know they want to view a funny movie, but, having a library of hundreds of comedic films, they are discouraged from taking the effort to peruse all of the available content to choose one.

It is an observed phenomenon that, while users may be discouraged from viewing content if they must themselves peruse and choose the content from a large library of choices, they are more prone to continue watching a piece of media that is simply presented to them. To extend the previous example of the user who wants to watch a funny movie, the same user who would prefer not to peruse a library of hundreds of comedies to choose one, will sit and watch a random comedy being broadcast on cable, satellite, or other type of television channel, even when that same film has been sitting in the user's digital media library unwatched.

The present disclosure provides for systems and methods for creation of digital library channels so as to create and/or simulate a broadcast channel using a user's digital media library. By creating and/or simulating a broadcast channel using a user's digital media library, the disclosed systems and methods create greater opportunities for users to view media content that they already own in their libraries. In turn, this incentivizes users to amass more digital content assets and grow their digital media libraries so as to diversify the content with which their channels may be populated.

Figure 2:
FIG. 2 provides an exemplary digital library channel lineup in accordance with an aspect of an embodiment of the present disclosure.

FIG. 2 depicts a sample digital library channel lineup 10. The lineup 10 shown in FIG. 2 includes four sample digital library channels 20, 30, 40, 50. Each of the digital library channels 20, 30, 40, 50 has digital media content scheduled to be played at particular times, much like a conventional broadcast channel (e.g., television or radio). For example, digital library channel 20 has a first digital media asset 22 currently playing (at 7:00 p.m.), a second digital media asset 24 scheduled to played at 8:00 p.m. once the first digital media asset 22 is completed, and a third digital media asset 26 scheduled to be played at 8:30 p.m., when the second digital media asset 24 is scheduled to be completed. Each digital media asset comprises one or more discrete pieces of digital media content. The other digital library channels 30, 40, and 50 are similarly populated with scheduled digital media assets (32, 34, 42, 44, 46, 48, and 52). Each piece of digital media content that is included in a digital library channel is a digital media asset that is owned by the user and contained in the user's digital media library.

There are numerous methods by which digital media channels may be populated with digital media content from the user's digital library. In one embodiment, a digital media channel may be populated completely randomly.

In another embodiment, a digital media channel may be populated according to certain criteria set by a service provider. This is depicted in FIG. 2. In this embodiment, the provider of the digital library channel service may automatically provide channels according to certain pre-set criteria. For example, the service provider may automatically provide channels for comedies (e.g., digital library channel 20 in FIG. 2), dramas, action films, ballads, hip-hop music, etc. Media content assets may be tagged with meta-data or other data-driven indicators of its content such that they can be categorized. Using these meta-data tags, a "comedy" channel can be populated with all video content that includes a tag indicating that the video is a comedy, and an "action" channel can be populated with all video content that includes a tag indicating that the video fits into the action genre. For the sake of explanation, channels have generally been discussed as being categorized into particular genres, but any sorting criteria may be used. Some examples might include key words, release date, actor/actress, director, artist, quality rating, duration, animated or live-action films, particular franchises or studios, or any other criteria by which digital media may be sorted.

In an alternative embodiment, rather than the service provider setting the criteria for channel creation, a user may create channels based on their preferred criteria.

It should be understood that each of these "embodiments" may be combined into a single embodiment such that a single user's digital library channel lineup may comprise one or more randomly created channels, one or more service-provider created channels, and one or more user-created channels. Further, each channel may be configured with more than one criteria.

When a user accesses a digital library channel, they are presented with what is "currently playing," similar to a user's experience when browsing through various television channels. Similar to a television channel, a user might turn to a digital library channel in the middle of the "currently playing" digital media content, i.e., at some point within the digital media content other than its beginning.

In one embodiment, a user's digital library channel (or channels) can be broadcasting on their local home network at all times. In a particular aspect of this embodiment, it may be preferable to perform such transmission using a user datagram protocol (UDP) transmission so as to minimize local bandwidth consumption.

Alternatively, since a particular user's digital library channel is played only on that particular user's entertainment system, there may be no need to continuously "broadcast" the channel when the user is not watching. However, in order to simulate a broadcast channel experience, the "broadcast" aspect may be simulated by populating a digital library channel and creating a "broadcast schedule," so that when the user turns to the digital library channel, the "currently playing" digital media asset will begin playing at the correct position based on the digital library channel's pre-set schedule. One way in which this embodiment may be implemented is by using time data based on the broadcast schedule to jump to the particular timecode corresponding to where the movie playback should be according to the broadcast schedule. For example, with a 2-hour movie starting at 6 PM, if a user tunes into the channel at 7:05 PM, the user device could request the appropriate media content from the appropriate storage device (e.g., a local storage device on the user device or on the user's local network, or from a remote storage database), and begin playback at the 65-minute mark.

In yet another alternative embodiment, the digital library channel may re-populate every time the user turns his or her entertainment system on, and the "broadcast" aspect may be simulated by randomly assigning a start point to the first media content asset that plays.

So as to encourage the user's experience of digital library channels as if they are normal broadcast channels, digital library channels may be presented to the user along with their usual broadcast channels (e.g., normal TV broadcast channels or radio stations, etc.). An aspect of this is demonstrated in FIG. 2, in which the user's normal TV broadcast channels (ESPN 15 and Disney 18) are presented in the user's viewing guide along with the user's digital library channels 20, 30, 40, 50.

Although the "broadcast" aspect discussed above may be desirable to make the user feel as if they are viewing an actual television channel, since the content that is being played on the digital library channel is content owned by the user, the user may be provided with additional flexibility in how they access, view, and interact with their digital content. For example, when a user tunes into a digital library channel (or at any point during the user's viewing of a digital library channel), a user may be presented with the option to either view the "currently playing" media content from its current position, or, alternatively, to view the currently playing media content asset from its beginning. Further, once a particular media content asset ends, a user may be provided with the option to move to the next media content asset scheduled to be played in the digital library channel, or the user may also be presented with the option to view other, related content that is in their digital media library. For example, a digital library channel may be scheduled to play Iron Man, and then Pocahontas. If the user turns to the channel and watches Iron Man, when the film completes, the user may be presented with the option to continue viewing the next scheduled media content asset (i.e., Pocahontas), or to view one or more related media content assets, such as Iron Man 2 or Avengers.

If a user chooses to take an action that somehow alters the digital library channel's presentation (e.g., starting the media content from the beginning rather than its current/scheduled position, or to view related content rather than the originally scheduled content), then the digital library channel may automatically update and re-populate based on the user's selections. Alternatively, the digital library channel may continue to run independently and separately from the user's selections, such that the digital library channel acts more like a normal broadcast channel that the user cannot alter once the schedule has been pre-populated, and the user's viewing takes place outside of the digital library channel.

In a further aspect of this disclosure, users are able to share their digital library channels with one another such that users can view each other's channels, such as the title of a movie playing now in the channel and a list of movies that are scheduled to play in the future. However, since each digital library channel is based on media content that users own in their personal digital libraries, users who receive a shared digital library channel can only view the content in the channel if they also own the digital content that is being played. In this way, the user receiving the shared digital library channel is either incentivized to view content they already own, or to purchase any unowned content that is in the shared digital library channel so that they are able to watch the digital library channel. Further, the ability to share digital library channels encourages users to cultivate their own digital media libraries so as to create interesting and robust digital library channels to share with their social network or the public.

Figure 3:
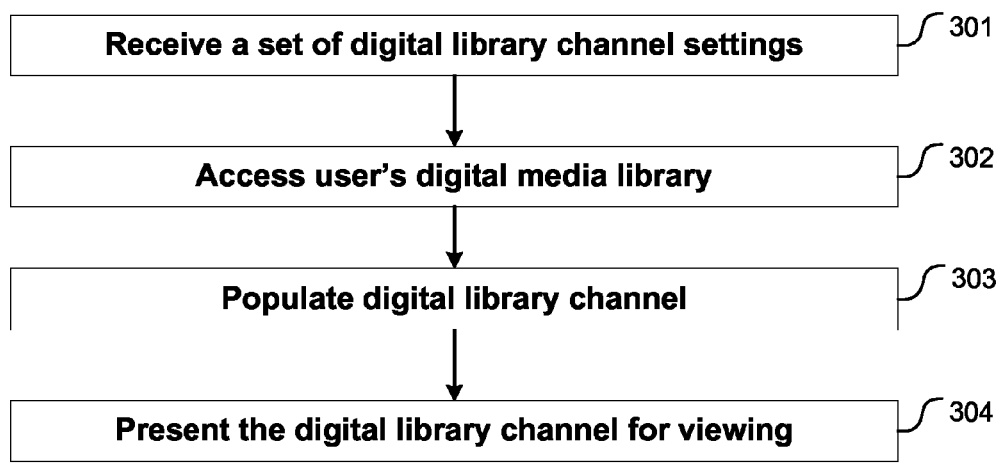
FIG. 3 provides a flow chart for a digital library channel creation method in accordance with an embodiment of the present disclosure.

FIG. 3 provides a flowchart for a digital library channel creation method 300 in accordance with an embodiment of the present disclosure. At block 301, the method comprises receiving a set of digital library channel settings. These settings, or criteria, define the media content to be included in a particular digital library channel. As discussed above, in one embodiment, there may be a channel in which there are no settings such that the content in the channel is not limited in any way, and the digital library channel may simply be a random selection of digital content assets from a user's library. Alternatively, the digital library channel settings may specify certain criteria, e.g., genre, release date, actor/actress, director, artist, quality rating, duration, franchise, studio, or any other criteria by which digital media may be sorted. Next, the method comprises accessing a user's digital media library (302) and populating the digital library channel with media content from the user's digital media library according to the digital library channel settings (303). As discussed above, the digital library channel may be populated randomly with any media content assets that meet the digital library channel settings. Alternatively, other considerations may be taken into account when populating the digital library channel. For example, if a user creates a "comic book" channel, in which only comic book films are shown, the channel may be programmed to play sequels or related films consecutively (e.g., Iron Man, Iron Man 2, Avengers, Thor, Thor 2, etc.). In yet a further embodiment, the user may be provided with the option to indicate a preference for grouping related films, or a preference not to group related films. Finally, the method comprises presenting the digital library channel for viewing (304).

It should be understood that while the figures have presented exemplary embodiments of the present systems and methods, revisions may be made to the disclosed systems and methods without departing from the scope of the present disclosure.

Where components or modules of the disclosed systems and methods are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 4:
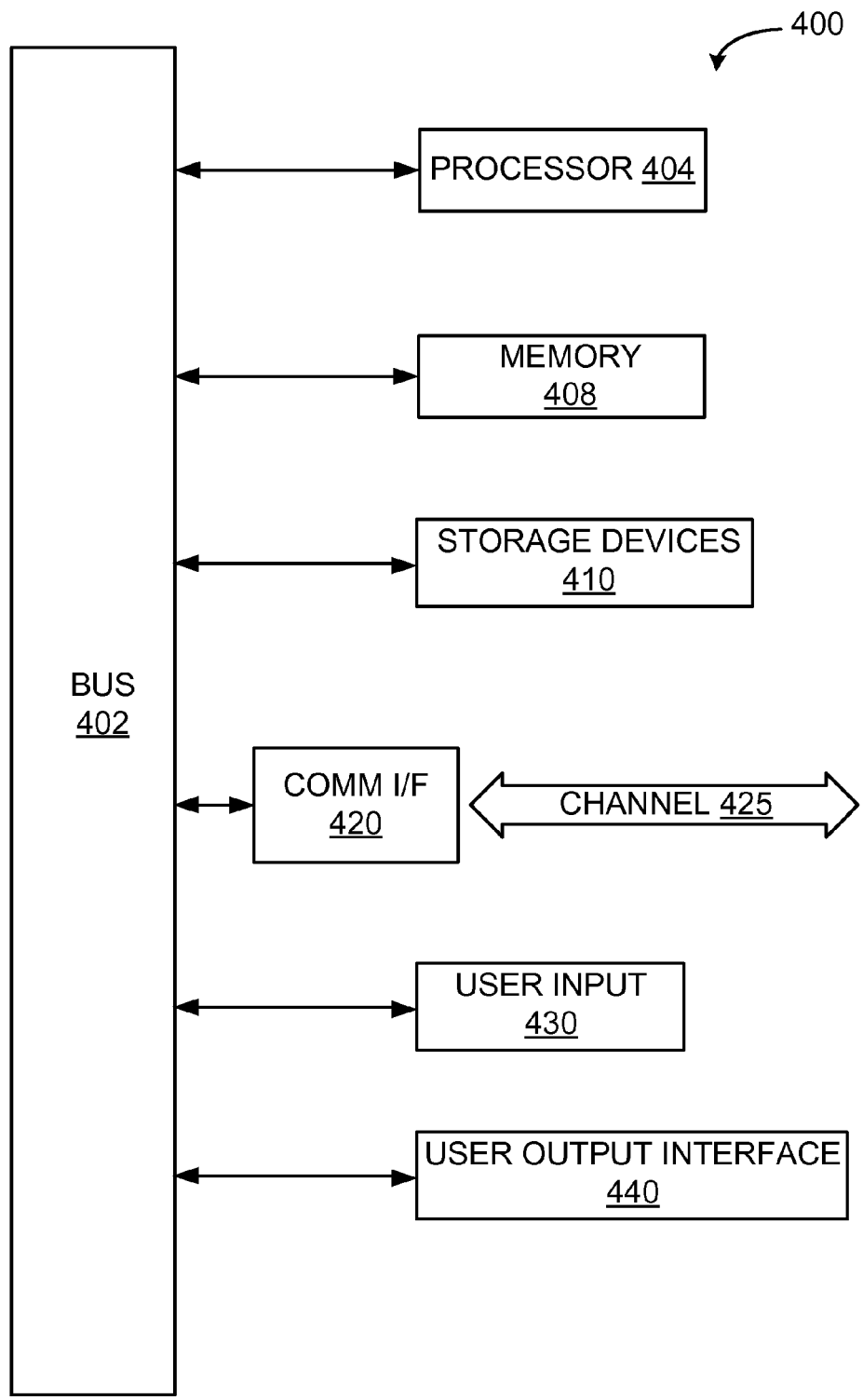
FIG. 4 illustrates a sample computing module that may be used to implement certain features and embodiments of the present disclosure.

Referring now to FIG. 4, computing module 400 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 400 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. Memory may include any non-transitory storage medium. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404. The computing module 400 might also include one or more various storage devices 410, which might include, for example, a magnetic tape drive, an optical disc drive, a solid state drive, or any other non-volatile memory.

Computing module 400 might also include a communications interface 420. Communications interface 420 might be used to allow software and data to be transferred between computing module 400 and external devices. Examples of communications interface 420 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 420 might typically be carried on signals, which can be electronic, electromagnetic (which includes optical) or other signals capable of being exchanged by a given communications interface 420. These signals might be provided to communications interface 420 via a channel 425. This channel 425 might carry signals and might be implemented using a wired or wireless communication medium. Some examples of a channel might include a phone line, a cellular link, an RF link, an optical link, a network interface, a local or wide area network, and other wired or wireless communications channels.

Computing module 400 might also include one or more user inputs 430. The user input allows for the user to enter commands to the computing module 400 and interact with it. Examples of user inputs might include a computer mouse, a keyboard, a touch-sensitive screen, a stylus, a mousepad, a joystick, an accelerometer, a gyroscope, a camera, a remote control, or any other user input mechanism.

The computer module 400 might also include one or more user output interfaces 440. The user output interfaces 440 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 408, storage unit 410, and channel 425. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:
1. A method comprising:
populating a digital library channel with a plurality of digital media assets from a user's digital media library arranged in a particular order and scheduled to play on a user device at scheduled times, wherein, for each of the plurality of digital media assets, the respective scheduled time corresponds to a particular time of day at which the digital media asset is scheduled to begin playback from a beginning point of the digital media asset, the plurality of digital media assets and scheduled times defining a simulated broadcast schedule; and presenting a current digital media asset according to the simulated broadcast schedule.

2. The method of claim 1, further comprising receiving one or more digital library channel settings on the user device, wherein the plurality of digital media assets populating the digital library channel are selected according to the one or more digital library channel settings.

3. The method of claim 2, wherein the one or more digital library channel settings are pre-loaded by a service provider.

4. The method of claim 2, wherein the one or more digital library channel settings are one or more user-specified digital library channel settings.

5. The method of claim 2, wherein the one or more digital library channel settings comprise at least one of the following: genre settings, franchise settings, studio settings, actor/actress settings, director settings, and/or quality rating settings.

6. The method of claim 1, wherein presenting the current digital media asset according to the simulated broadcast schedule comprises playing the current digital media asset from a point within the current digital media asset that is not a beginning point of the current digital media asset.

7. The method of claim 6, further comprising:
presenting an option to view the current digital media asset from the beginning point of the current digital media asset;
receiving a command to play the current digital media asset from the beginning point of the current digital media asset; and
playing the current digital media asset from the beginning point of the current digital media asset.

8. The method of claim 1, further comprising:
transmitting digital library channel information to a second user;
accessing a digital library associated with the second user;
determining whether the current digital media asset is in the digital library associated with the second user; and
if the current digital media asset is contained in the digital library associated with the second user, playing the current digital media asset, or
if the current digital media asset is not contained in the digital library associated with the second user, offering the second user an opportunity to acquire the current digital media asset.

9. The method of claim 1, wherein presenting the current digital media asset comprises broadcasting the digital library channel on the user's local home network at all times.

10. The method of claim 1, wherein presenting the current digital media asset comprises broadcasting the digital library channel on the user's local home network using a user datagram protocol.

11. The method of claim 6, further comprising:
receiving user input that generates an altered version of the current digital media asset presented according to the simulated broadcast schedule; and
responsive to the user input, presenting the altered version of the current digital media asset separately from the current digital media asset presented according to the simulated broadcast schedule.

12. A non-transitory computer readable medium comprising an instruction set configured to cause a computing device to perform:
populating a digital library channel with a plurality of digital media assets from a user's digital media library arranged in a particular order and scheduled to play on a user device at scheduled times, wherein, for each of the plurality of digital media assets, the respective scheduled time corresponds to a particular time of day at which the digital media asset is scheduled to begin playback from a beginning point of the digital media asset, the plurality of digital media assets and scheduled times defining a simulated broadcast schedule; and
presenting a current digital media asset according to the simulated broadcast schedule.

13. The non-transitory computer readable medium of claim 12, wherein the instruction set is further configured to cause a computing device to perform: receiving one or more digital library channel settings on a user device, wherein the plurality of digital media assets populating the digital library channel are selected according to the one or more digital library channel settings.

14. The non-transitory computer readable medium of claim 13, wherein the digital library channel settings are pre-loaded by a service provider.

15. The non-transitory computer readable medium of claim 13, wherein the one or more digital library channel settings are one or more user-specified digital library channel settings.

16. The non-transitory computer readable medium of claim 13, wherein the one or more digital library channel settings comprise at least one of the following: genre settings, franchise settings, studio settings, actor/actress settings, director settings, and/or quality rating settings.

17. The non-transitory computer readable medium of claim 12, wherein presenting the current digital media asset according to the simulated broadcast schedule comprises playing the current digital media asset from a point within the current digital media asset that is not a beginning point of the current digital media asset.

18. The non-transitory computer readable medium of claim 17, wherein the instruction set is further configured to cause a computing device to perform:
presenting an option to view the current digital media asset from a beginning point of the current digital media asset;
receiving a commend to play the current digital media content from the beginning point of the current digital media asset; and
playing the current digital media asset from the beginning point of the current digital media asset.

19. The non-transitory computer readable medium of claim 12, wherein the instruction set is further configured to cause a computing device to perform:
transmitting digital library channel information to a second user;
accessing a digital library associated with the second user;
determining whether the current digital media asset is in the digital library associated with the second user; and
if the current digital media asset is contained in the digital library associated with the second user, playing the current digital media asset, or
if the current digital media asset is not contained in the digital library associated with the second user, offering the second user an opportunity to acquire the current digital media asset.

20. The non-transitory computer readable medium of claim 12, wherein presenting the current digital media asset comprises broadcasting the digital library channel on the user's local home network at all times using a user datagram protocol.

* * * * *